UNITED STATES PATENT OFFICE.

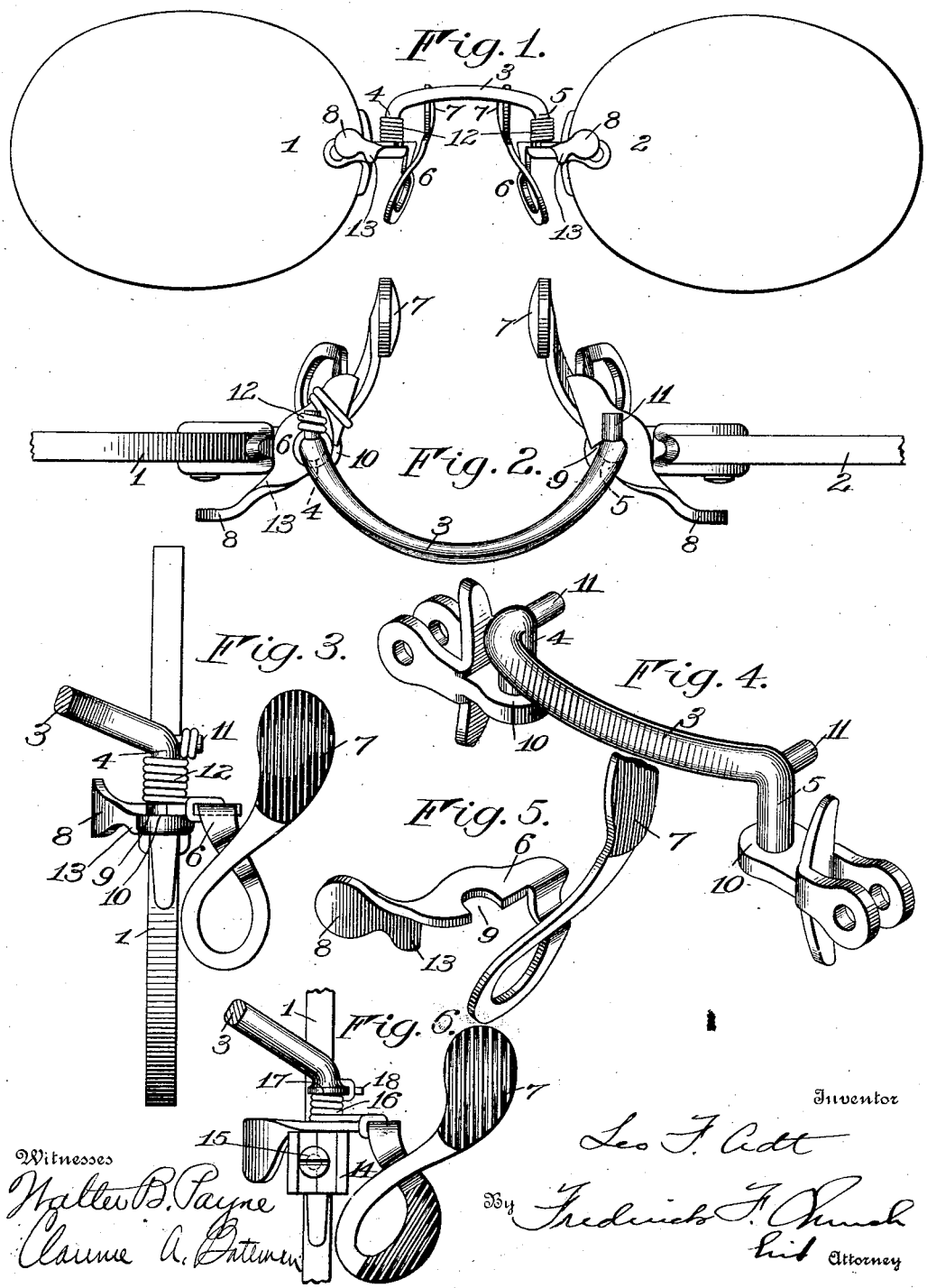

LEO F. ADT, OF ALBANY, NEW YORK.

EYEGLASSES.

No. 887,901.   Specification of Letters Patent.   Patented May 19, 1908.

Application filed April 30, 1906. Serial No. 314,331.

*To all whom it may concern:*

Be it known that I, LEO F. ADT, of Albany, in the county of Albany and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to improvements in eyeglasses, and particularly to the type embodying finger-operated nose guards for properly holding the eyeglasses on the wearer's nose, and the object of the invention is to provide an improved mounting of this kind having nose guards that may be conveniently operated by the wearer's fingers in applying and removing the eyeglasses, and in which the pupillary distance between the lenses is not unduly increased, the construction of the mounting being simple and compact so that the eyeglasses will not be conspicuous when in use.

To these and other ends the invention consists in certain improvements and combinations of parts all as will be hereinafter more fully explained, the novel features being pointed out in the claims at the end of the specification.

In the drawings: Figure 1 represents a front elevation of a pair of eyeglasses constructed in accordance with my invention. Fig. 2 is a top plan view on an enlarged scale, of the eyeglasses shown in Fig. 1. Fig. 3 represents a central cross section of the eyeglasses shown in Figs. 1 and 2, as viewed from the right. Fig. 4 is a perspective view of the bridge with the guards and lenses detached. Fig. 5 is a perspective view of one of the guards detached from the mounting, and Fig. 6 is a view similar to Fig. 3 showing another embodiment of my invention.

Similar reference numerals in the several figures indicate similar parts.

My present invention provides an improved mounting of the type hereinbefore described wherein the nose-guards or bearing portions are so mounted as to require a minimum space between the proximate ends of the lenses so as not to unduly increase the pupillary distance as is necessary in some of the mountings of this general type, and in which certain parts of the mounting are utilized as a mounting or bearing for the guards and their related parts.

The mounting shown in Figs. 1–5 inclusive illustrates one embodiment of my invention, comprising the lenses 1 and 2 connected by a bridge 3, the latter being preferably substantially rigid to maintain the proper relation between the lenses, and having preferably the substantially vertically-extending arms or pivot portions 4 and 5 at each side, of round or other appropriate cross-section to serve as fulcrums, supports or guides for the guards 6. The latter, for the purposes of the present invention, may be of any desired type having a nose-engaging portion 7 at their rear ends, a finger piece or operating projection 8 at their forward ends, and a suitable bearing, preferably a recess 9 at a point intermediate of the nose-engaging portions and the operating projections, adapted to fit the bearing portions of the bridge. Below the bearing of the guard is preferably provided a shoulder or seat 10 and at a spaced distance above it is a projection 11, the latter being preferably formed on a part of the bridge, and on the bearing portion of the bridge between the upper side of the guard and the projection 11 is coiled a spring 12, the latter being preferably a helical spring having one end fixed to the projection 11 and its other end attached to a portion of the nose guard at one side of its bearing. These guard-operating springs are suitably coiled to cause normally a proximating movement of the nose-engaging portions of the guards, and the convolutions of the spring are preferably closely arranged in order to hold the guard down upon the seat 10 and to prevent tilting of the guard, and in order to limit the movement of the guards when disengaged from the wearer's nose, it is preferable to provide a stop 13 on each guard arranged to engage a part of the mounting, and these stops will serve to hold the operating projections in position for convenient operation.

In Fig. 6 the invention is shown in connection with a mounting embodying separable parts, the lens having an attaching device provided with the usual box 14 and fastening screw 15 for securing the attaching portion of the bridge to the lens. The bridge shown in this embodiment of the invention has a substantially vertically-extending portion at each end adapted to be secured in the box of the attaching device, and is preferably narrow to enable it to receive a nose guard provided with a hole to fit it and serve as a bearing for the guard, the latter being slipped on over the end of the bridge in case a closed aperture is formed in the guard. The guard in this form preferably rests on the top of the box as a support, and is attached to one end of a spring 16, the latter being coiled about the vertical portion of the bridge and resting at its upper side against a shoulder 17 on the bridge and having its extremity attached to a projection 18 preferably formed on the bridge, the guard-operating spring fitting closely between the shoulder 17 and the upper side of the guard to hold the latter seated on top of the box to prevent tilting, and as in the previously described form, the spring is properly coiled to normally cause a proximating movement of the nose-engaging portions of the guards. A mounting of the kind just described is particularly advantageous in cases where it is necessary or desirable to make up the mounting from separate parts to suit each individual, and it also has the advantage of enabling the use of the ordinary form of eyeglass mounting in connection with the invention, the only special part required being a bridge of a particular form.

Eyeglasses of the type embodying my invention possess valuable advantages over the ordinary eyeglasses, as the guards are the only parts that are necessarily movable and these may be conveniently operated by the fingers of the wearer, enabling the use of a relatively rigid bridge or connection between the lenses that will maintain the latter in their proper relation at all times and thus preventing deviation of their optical centers relatively to the wearer's eye, and my present invention provides an improved manner of mounting the guards on the mounting whereby a minimum space is required between the inner edges of the lenses, thereby enabling the use of a bridge of the usual width without unduly increasing the pupillary distance between the lenses.

Another important advantage is obtained by mounting the guards and their parts on the bridge, and preferably at points intermediate its attached ends as a journal bearing or guide, as the number of parts required is reduced and the construction simplified, and as the construction is very compact and neat in appearance, the mounting will not be conspicuous when in use, and while in the present embodiments of the invention, the guards are shown as mounted on relatively vertically extending portions of the bridge, the invention is not limited in this respect, for while it is generally preferable that the guards should operate in a substantially horizontal plane, this is not always essential, as the guards in accordance with my present invention may be applied to bridges of different forms.

I claim as my invention:

1. In eyeglasses, the combination with the lenses, and a bridge attached thereto having pivot portions formed thereon at points intermediate its attached ends, of nose guards mounted to turn on said pivot portions and having projections by means of which the guards may be operated.

2. In eyeglasses, the combination with the lenses, and a bridge having intermediate vertically extending arms attached at their ends to the lenses, of nose guards arranged between the proximate ends of the lenses and mounted to operate in substantially a horizontal plane about said arms of the bridge as vertical axes.

3. In eyeglasses, the combination with the lenses, of a bridge attached to the lenses and having substantially vertical arms to serve as bearing portions arranged thereon between the proximate ends of the lenses and intermediately of the attached portions of the bridge, and nose guards mounted to turn about said bearing portions of the bridge as vertical axes.

4. In eyeglasses, the combination with the lenses having suitable attaching devices thereon, of a bridge having intermediate vertical pivot portions thereon arranged between the proximate ends of the lenses and connected to the attaching devices, and nose guards having bearings coöperating with the said pivot portions of the bridge, and provided with forwardly extending operating projections.

5. In eyeglasses, the combination with the lenses, and a bridge attached thereto and having intermediate portions thereof forming pivots, of nose guards having bearings arranged to turn on said pivot portions of the bridge, and springs for the guards each supported and guided on an intermediate portion of the bridge and connected to operate the guards.

6. In eyeglasses, the combination with the lenses, and a bridge connecting the lenses and having the intermediate portions thereof forming pivots and the spaced abutments arranged on the pivot portions, of nose guards each having a bearing on one of said pivot portions and resting against one of said abutments, and a spring encircling each pivot portion and fitting closely between the guard and the other abutment, said springs being connected for operating the guards.

7. In eyeglasses, the combination with the lenses, a bridge connecting the lenses having a seat formed near each attached end and also having intermediate portions thereof forming vertical bearings extending upwardly from the seat, of nose guards each mounted to turn about one of said bearings on the bridge and resting on said seat, and a spring encircling said bearing on the bridge above the guard and operatively connected to the guard and a relatively fixed part of the mounting.

8. In eyeglasses, the combination with the lenses having attaching means connected thereto, of a bridge comprising the central portion and the vertically-extending arms arranged between the proximate edges of the lenses and connecting the bridge to the attaching devices, of nose guards mounted to turn on said arms as vertical axes, and having nose-engaging portions thereon in rear of the plane of the lenses and finger pieces thereon forward of the plane of the lenses, and springs carried and guided by said arms on the bridge for operating the guards to engage the wearer's nose.

9. In eyeglasses, the combination with the lenses and attaching devices thereon, a bridge having attaching ends removably connected to said attaching devices and having bearings thereon above the attaching ends, guards pivoted on the bearings and springs for proximating said guards.

10. In eyeglasses, the combination with the lenses, the boxes secured thereto, the bridge having vertical bearing portions thereon and attaching ends below the bearing portions secured in the boxes, of the nose guards pivoted on the bearing portions and springs for proximating the guards.

11. In eyeglasses, the combination with the lenses, the boxes secured thereto, the bridge having portions entering the boxes and provided with bearing portions above their ends, and means for securing the bridge ends in the boxes, of the guards pivoted on the bearing portions of the bridge and springs for proximating the guards.

12. In eyeglasses, the combination with the lenses, the boxes secured thereto, the bridge having portions entering the boxes and provided with bearing portions above their ends, and means for securing the bridge ends in the boxes, of the guards supported on the boxes, pivoted on the bearing portions of the bridge and having the finger pieces and springs for proximating the guards.

13. A bridge for eyeglasses, having attaching ends adapted to be secured to suitable lens attaching devices, and nose guards with forward extending operating projections, mounted on the bridge to turn about vertical axes above the attaching ends.

14. The combination with the vertical boxes, of a bridge detachably secured within the boxes, and nose guards with forwardly extending operating projections, mounted to turn about vertical axes above the boxes.

15. In eyeglasses, the combination with a bridge, of nose guards mounted to swing about vertical axes, and coil springs surrounding the bridge near each end and connected to the guards to position them.

16. In eyeglasses, the combination with a bridge formed with vertically extending portions at its ends, of nose guards mounted to swing about vertical axes on the bridge, and coil springs having axes coincident with the vertically extending portions of the bridge.

17. In eyeglasses, the combination with a bridge formed with vertically extending portions at its ends, of nose guards mounted to turn about axes coincident with the vertically extending portions.

18. In eyeglasses, the combination with a bridge formed with vertically extending portions at its ends, of nose guards mounted to turn about axes coincident with the vertically extending portions, and coil springs for positioning the guards having their axes coincident with the axes of the nose guards.

19. In eyeglasses, the combination with the boxes of a bridge having vertically arranged attaching ends detachably secured in the boxes, nose guards mounted to swing about vertical axes, and coil springs having their axes coincident with the attaching ends, positioning the guards.

LEO F. ADT.

Witnesses:
EDWARD MURPHY, 2d,
MICHAEL F. O'CONNOR.